United States Patent

Busse

[11] Patent Number: 6,095,562
[45] Date of Patent: Aug. 1, 2000

[54] RESTRAINING SYSTEM FOR TRUCK AND TRAILER WHEELS

[76] Inventor: Stuart A. Busse, 302 Main Street, Biggar, Saskatchewan, Canada, S0K 0M0

[21] Appl. No.: 09/014,824

[22] Filed: Jan. 28, 1998

[30]     Foreign Application Priority Data

Mar. 7, 1997 [CA] Canada .................................. 2199429
Jun. 27, 1997 [CA] Canada .................................. 2207692

[51] Int. Cl.[7] ................................................. B60R 21/00
[52] U.S. Cl. .......................................... 280/762; 280/727
[58] Field of Search .................................... 280/762, 781, 280/160, 768, 769, 770, 727; 180/271

[56]              References Cited

U.S. PATENT DOCUMENTS

| | | | |
|---|---|---|---|
| 2,581,526 | 1/1952 | Geyer | 280/160 |
| 2,605,119 | 7/1952 | Earnest | 280/160 |
| 2,627,437 | 2/1953 | Toncray et al. . | |
| 5,462,324 | 10/1995 | Bowen et al. . | |
| 5,924,513 | 7/1999 | Jones | 280/762 |

OTHER PUBLICATIONS

Canadian Application Serial No. 2,157,940 published Nov. 17, 1995 to Benoit (this was cited in prosecution of the corresponding Canadian application).

A photograph and short caption from the Ottawa Citizen newspaper, dated Feb. 28, 1997.

A copy of a newspaper article from the Toronto Star, dated Nov. 6, 1997 in regards to a Wheel Retraining Device invented by a Mr. Thorndike.

*Primary Examiner*—Richard M. Camby
*Attorney, Agent, or Firm*—R. Lewis Gable; Cowan Liebowitz & Latman PC

[57]               ABSTRACT

The present invention provides a restraining system for an axle mounted wheel of a vehicle, the vehicle having a frame to which the axle is secured, leaving sufficient clearance to avoid road hazards and not interfere with the wheels motion during normal operation of the vehicle. The system comprises a cage assembly secured to the frame in the vicinity of the vehicle so as to leave a lower part of the wheel exposed, allowing the wheel to contact the road and to retain the wheel in close proximity to its original installation point and entrap the wheel and carry it along with the vehicle should it become detached from the axle.

10 Claims, 3 Drawing Sheets

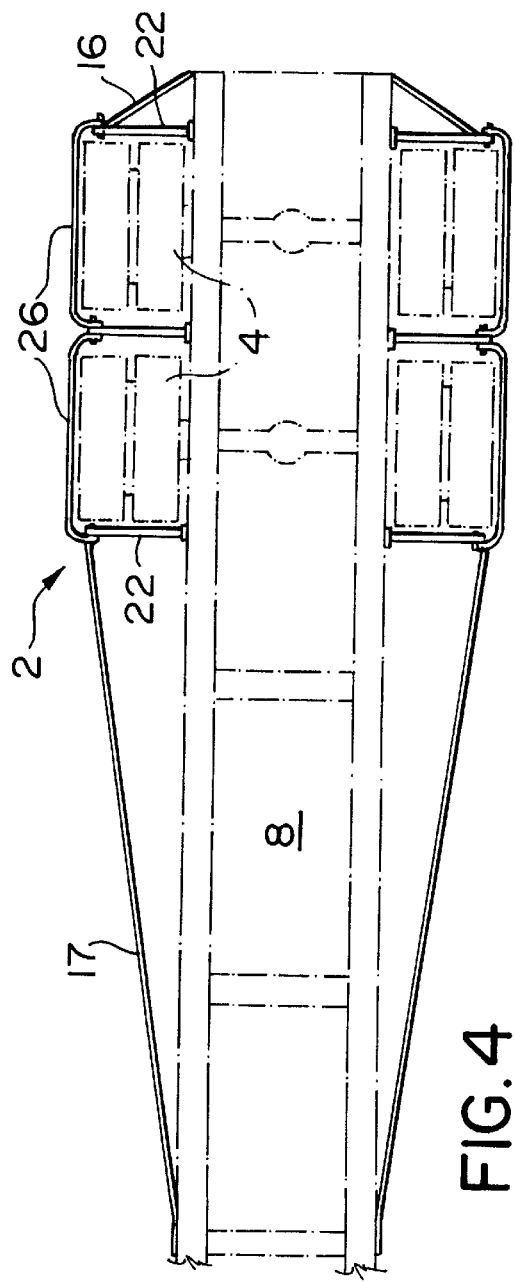
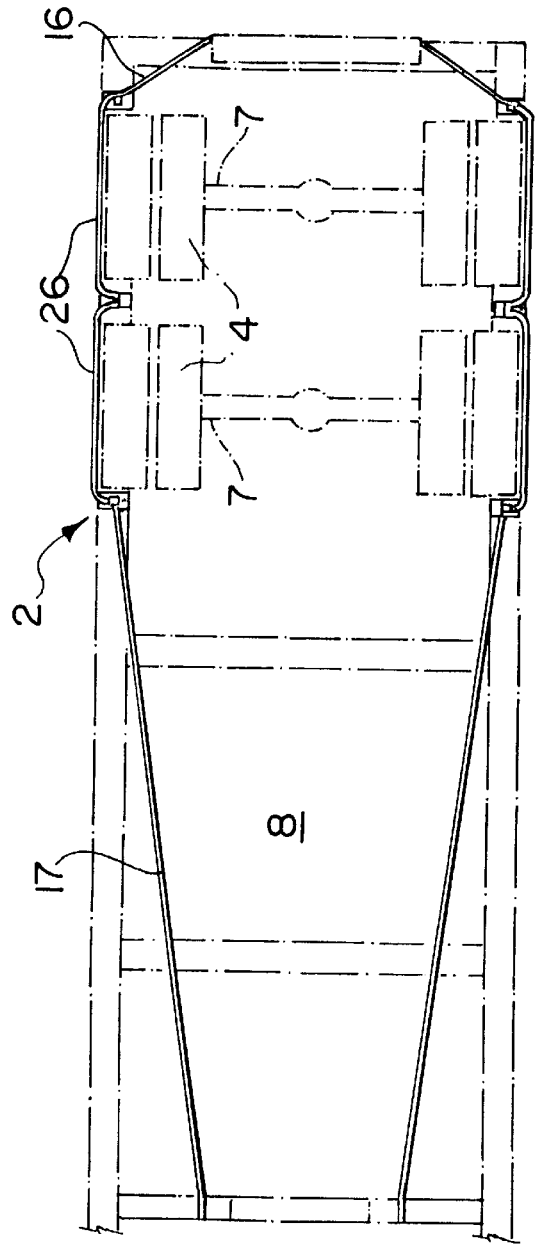

RESTRAINING SYSTEM FOR TRUCK AND TRAILER WHEELS

FIELD OF THE INVENTION

The present invention relates to a restraining system for wheels of transport trucks and trailers and more particularly relates to a construction which will prevent such wheels, which become accidently detached from secured position on the motoring vehicle, from travelling unrestricted and causing property damage, injury or death.

BACKGROUND OF THE INVENTION

On highway transport trucks and trailers there are wheels that are bolted in place. There have been truck and trailer wheels and wheel assemblies accidentally detaching from the moving vehicle. Once detached the wheels or assemblies will travel unrestricted causing property damage, injury or death.

At present there is no method of restraining accidentally detached wheels or wheel assemblies on transportation vehicles. The standard at present is to rely upon the installation of the wheel and wheel assembly without any secondary restraining mechanism. This system allows for the original installation mechanism to fail totally and still retain the wheel or wheel assembly to the vehicle.

The wheel assembly, when in operation, is a relatively heavy rotating mass that is mounted on an axle, using bearings and a wheel hub. Problems will arise when the wheel breaks or separates from the wheel hub, the wheel bearing and/or wheel hub fail or the axle breaks. In these situations, some or all of the wheel assembly will separate from the vehicle and will not be restrained.

In all of these failing situations, the portion of the wheel or wheel assembly that is detached must move away from the vehicle in unrestrained fashion.

Of background interest are U.S. Pat. No. 2,627,437 of M. H. Toncray et al issued Feb. 3, 1953 and U.S. Pat. No. 5,462,324 of Bowen et al issued Oct. 31, 1995, describing respectively an automobile frame construction and a wheel guard attachment for motor vehicles.

SUMMARY OF THE INVENTION

In accordance with the present invention there is provided a restraining system for an axle mounted wheel of a vehicle, the vehicle having a frame to which the axle is secured, leaving sufficient clearance to avoid road hazards and not interfere with the wheels motion during normal operation of the vehicle. The system comprises a cage assembly secured to the frame in the of the vehicle and passing in front of, laterally along an exterior side of, and behind the wheel so as to leave a lower part of the wheel exposed to allow the wheel to contact a road and have unobstructed movement during normal operation of the vehicle, and to retain the wheel in close proximity to its original installation point and entrap the wheel and carry it along with the vehicle should it become detached from the axle.

The cage comprises a series of bars secured to the frame and extending downwardly from that frame, in front of the wheel, behind it, and along an exterior side of it. The bars provide an outside clearance for the wheel which is less than the distance the wheel must move laterally and outwardly to come off of the axle. A lesser clearance is provided from the outer edge of the associated tire at the front than from the outer edge of the rear of that tire. In this manner, the tire, if it has come off of the axle during forward movement of the vehicle, will be steered by the bars inwardly at the front and hence back towards the axle.

The cage in accordance with the present invention restrains accidently detached vehicle wheels from escaping from the moving vehicle by surrounding the wheel or wheel assembly and directing a detached wheel back towards its axle.

BRIEF DESCRIPTION OF THE DRAWINGS

These and other advantages of the invention will become apparent upon reading the following detailed description and upon referring to the drawings in which:

FIG. 4 is a schematic plan view, from below, of an alternative embodiment of a wheel restraining system in accordance with the present invention as applied to a trailer; and FIG. 5 is a schematic plan view, from below, of yet a further alternative embodiment of a wheel restraining system in accordance with the present invention as applied to a trailer;

Figure 1:
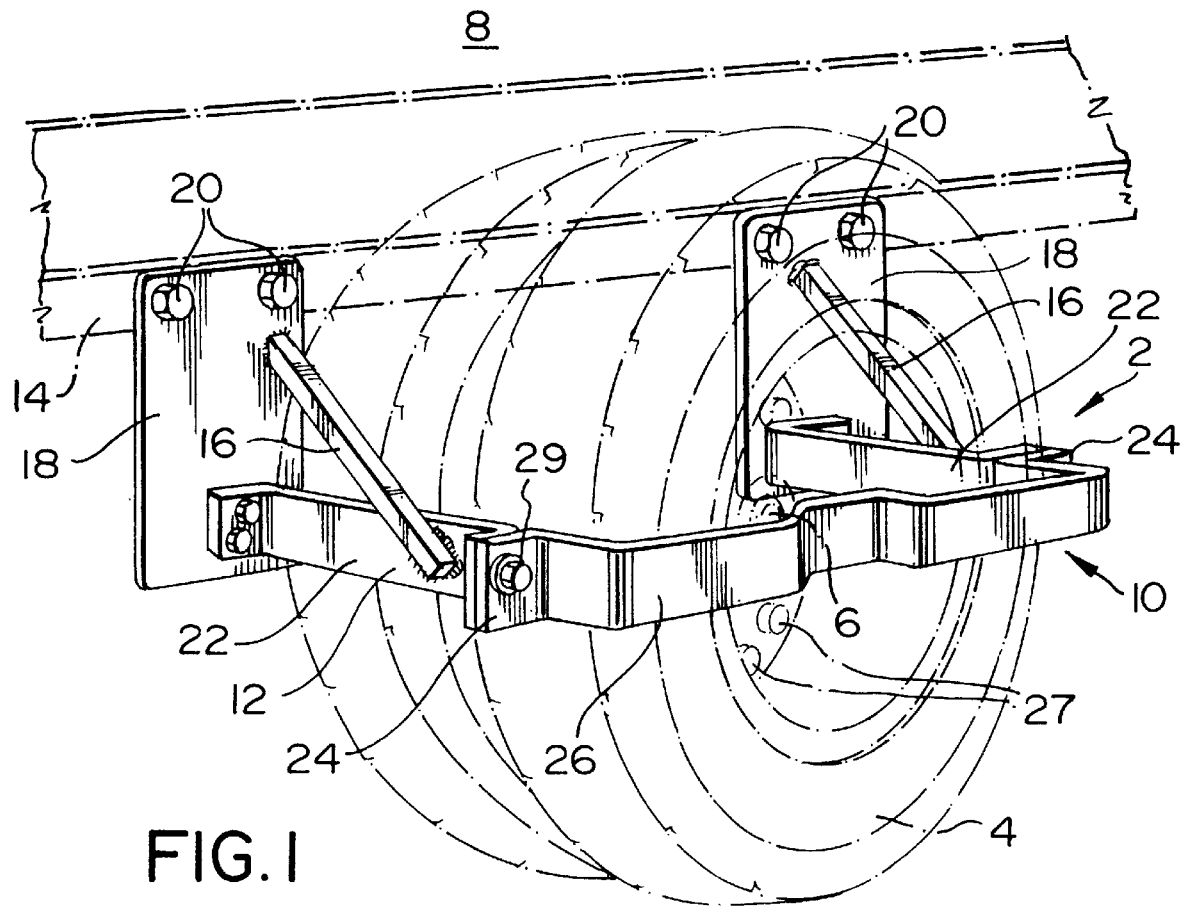
FIG. 1 is a perspective view of a restraining system for vehicles in accordance with the present invention, as applied to a transport trailer.

While the invention will be described in conjunction with example embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

In the following description, similar features in the drawings have been given similar reference numerals.

Turning to FIG. 1, there is shown a restraining system 2 for wheels 4 which are mounted on hub 6 secured to axle 7 of a trailer 8. Restraining system 2 comprises a cage 10 made of bars or plates 12, preferably made from spring steel. Cage 10 is welded or otherwise secured to the frame 14 of trailer 8 and is constructed so as to leave only the lower portion of the wheel 4 exposed, allowing wheel contact with the road and to leave sufficient clearance to avoid road hazards. Preferably the cage is supported by appropriate angle braces 16. It has been found that a cage clearance of approximately of two inches at the front and back of the wheel, and one and one-half inches at the front outside of the wheel and two inches at the rear outside of the wheel are appropriate to provide unobstructed operation of the vehicle under normal circumstances. The outside clearance for the wheel should be less than the distance the wheel must move laterally and outwardly to come off hub 6. As well, by having the front outside clearance slightly less than the rear outside clearance, if a wheel should become detached during forward movement of the vehicle, the cage will act to steer the wheel inwardly and back into position on the wheel hub 6.

In operation, restraining bars 12 of the cage 10, prevent the wheel 4 from escaping either away from (to the side) or under the vehicle.

Of course, the actual physical construction of cage 10 can vary. The extent of covering of cage 10, as well as the location of bars 12 on the side, would be dictated by the requirements and appearance of the vehicle or trailer that the wheel cage 10 is mounted on. The wheel cage should be of sufficient strength and attachment to withstand the load of the vehicle on the cage without total destruction or detachment.

Alternative constructions of cages, illustrated in FIGS. 4 and 5, show such constructions for trailers where the wheels 4 extend outwardly beyond the side of the frame 14 (FIG. 4) and where the wheels 4 are located under frame 14 (FIG. 5). In these embodiments, the securing of cage 10 on frame 14 is further reinforced by angled connecting bars 17 extending between and secured to portions of the frame and spaced locations on the frame 14, as illustrated.

Cage 10 could have optional plates or belting (not illustrated) that would act as fenders and/or mud flaps. As well, using the cage 10 as a secure mounting place, optional side bumpers (again, not illustrated) could be mounted alongside, both forward and back of the wheel cage, of the vehicle to offer some protection against other vehicles or persons becoming entrapped under the wheel and thereby substantially reduce the risk to users of the road.

Various warning flags, sensors and warning devices may be attached as desired to the restraining bars 12 of cage 10, or other suitable place, to draw the vehicle operator's attention to a detached wheel or wheel assembly that is being restrained.

The wheel restraining cage 10 according to the present invention may be securely mounted to the frame of the vehicle using, for example, a mounting plate 18 attached to the frame by bolts 20. The mounting plate has arms 22 attached to it, extending laterally from the frame of the vehicle in very close proximity to the wheel. Those arms 22 are made of metal tubing or plates and are fixed in their position. These arms extend outwardly to about one to two inches from the outside edge of the tire 4 of the wheel assembly. At the outside edge of arms 22 is a mounting plate 24 for the attachment of the side restraining arms or plates 26. (Arms 22 and 26 form the restraining bars 12 for cage 10.) In this manner, if a wheel 4 comes loose from its bolted position on the wheel assembly, that wheel will be restricted from lateral movement by coming into contact with the metal tube or plate arm 26 in question. There are two arms 22 for each wheel 4 that is to be restrained, with one arm 22 in front of the wheel 4 and one arm 22 in back thereof, with about a two inch clearance between the front of the tire and the front arm 22, and about a two inch clearance between the rear arm 22 and the back of wheel 4. The arms 22 may be configured so that they angle downwardly such that the exterior end of each arm will be at the same elevation as the center of the wheel 4 and its associated hub 7 and axle 6.

The side restraining arm or plate 26 is configured such that it extends laterally, spaced from the frame of the vehicle, from its points of attachment to arms 22, with a clearance of about one and one half inches from the outer edge of its associated tire 4 at the front and a clearance of about two inches at the outer edge of the rear of the tire 4. The restraining arm 26 runs parallel to the outside edge of the rubber tire, being attached at each end to arms 22. The center of the restraining arm 26, at bar 28 may extend about three to three and one half inches inwardly towards the frame towards the center of the wheel axle 7.

This arrangement is completed for each wheel assembly of the vehicle except for any steering axles.

The components of the wheel cage 10 are manufactured such that clearance from the operating wheel is kept to a minimum so that those portions of the wheel or wheel assembly that may accidently detach from their operating position are restrained within the wheel cage 10.

As an option, a mechanism (not illustrated) may be installed to prevent vehicles or people from accidently going under transport trucks or trailers during a side on contact or to keep such from being trapped by the wheel assembly. By using the secure mount of the wheel cage and installing another similar secure mount further along the side of the truck and/or trailer, a side bumper would be installed to protect against vehicles or people from entering under the subject vehicle.

Figure 2:
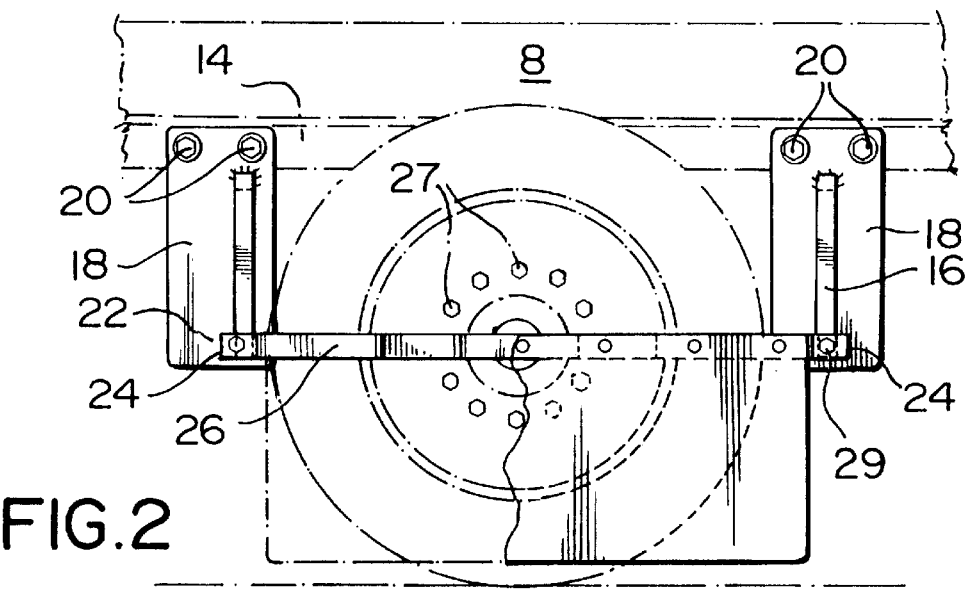
FIG. 2 is a side view of the system of FIG. 1.

It will be understood that the bolts 29 supporting side arm 26 may be removed so as to permit removal of the arm 26 from arms 22 when purposeful removal of the tire, for example, for repairs or replacement, is required. The level of side arm 26, as seen in FIGS. 1 and 2, for certain constructions of wheel assemblies or certain applications, may be secured in a raised position (not illustrated) with respect to the tire hubs, or in a lower position (again not illustrated) with respect thereto.

The cage 10 components may be made of metal or other materials such as sturdy plastic or a combination thereof. Cage 10 may alternatively have its components made of flexible material such as spring steel so that it will resume its original shape if bumped by something externally.

Figure 3:
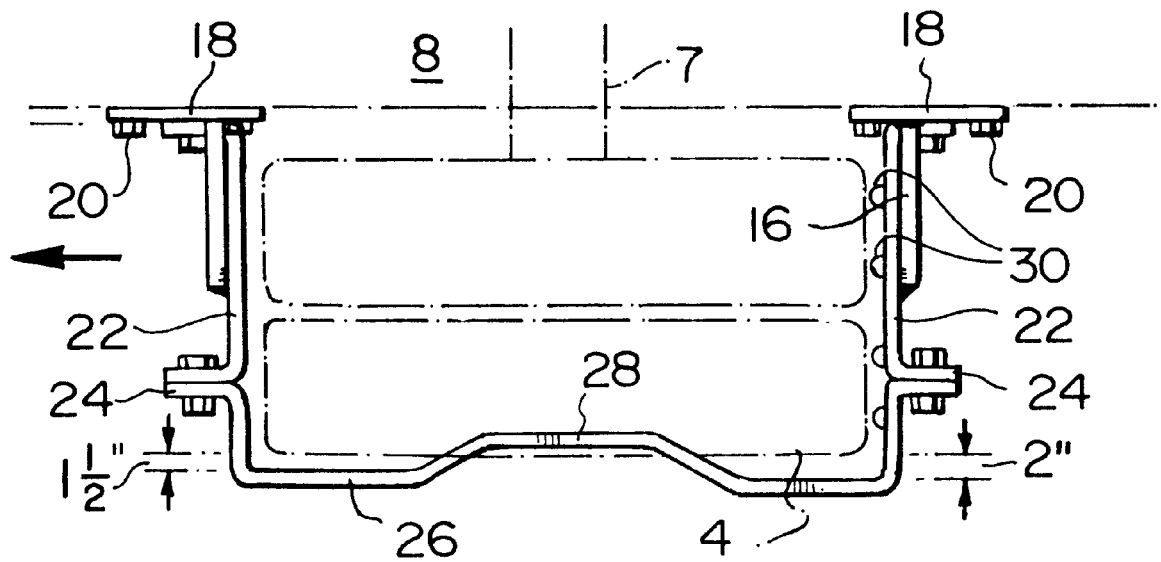
FIG. 3 is a plan view from the bottom of the system of FIG. 1.
Figure 6:
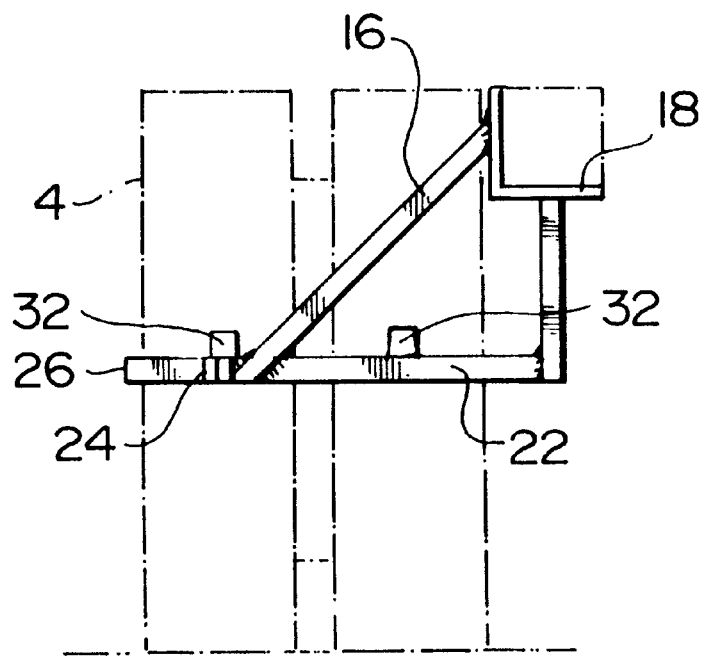
FIG. 6 is a schematic, partial, elevational view, from the rear, of a wheel assembly of a vehicle on which an alternative embodiment of wheel restraining system according to the present invention has been mounted.

As an optional embodiment of the wheel cage, according to the present invention, a rotating or low friction part 30, such as a wheel or bearings or a skid plate, mounted on arm 26, illustrated for example in FIG. 3, may be provided so as to facilitate continued rotation of a detached wheel 4 when it comes in contact with that portion of the arm 26. A sensor 32 may also be associated with that part to detect a change in its operation or condition, and provide a signal, for example audibly or electronically to the driver's cab, to alert the driver to a problem of a disassociated, or becoming-disassociated wheel.

As another optional embodiment, a flexible curtain 36 (shown in FIG. 2), for example of rubber, may be suspended from arm 26, and/or arms 22 to minimize spray from proximal wheels 4 when on wet roads.

Thus, it is apparent that there has been provided in accordance with the invention a restraining system for truck and truck wheels that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

The embodiments of the invention in which an exclusive property or privilege is claimed are defined as follows:

1. A restraining system for an axle mounted wheel of a vehicle, the vehicle having a frame to which the axle is secured, leaving sufficient clearance to avoid road hazards and not interfere with the wheel's motion during normal operation of the vehicle, the system comprising a cage assembly secured to the frame and passing in front of, laterally along an exterior side of, and behind the wheel of the vehicle so as to leave a lower part of the wheel exposed, to allow the wheel to contact a road and have unobstructed movement during normal operation of the vehicle and to retain the wheel in close proximity to its original installation point and entrap the wheel and carry it along with the vehicle should it become detached from the axle, the cage comprising a series of bars secured to the frame and extending downwardly therefrom, and in front of, behind and along an exterior side of the wheel, the bars providing an outside clearance for the wheel which is less than the distance the wheel must move laterally and outwardly to come off the axle, with a lesser clearance being provided from the outer edge of its associated tire at the front than from the outer edge of the rear of that tire, whereby the tire, if it has come off of the axle, during forward movement of the vehicle, will be steered by the bars inwardly at the front and hence back towards the axle.

2. A system according to claim 1 wherein, during normal operation of the vehicle, the cage provides a clearance of from about one to two inches on an exterior side of the wheel.

3. A system according to claim 1 wherein the side bar is one of the series of bars and extends beside the wheel about its midpoint.

4. A system according to claim 1 wherein, during normal operation of the vehicle, the cage provides a clearance of from one to two inches on an exterior side of the wheel.

5. A system according to claim 3 wherein the series of bars provides a clearance of approximately one and a half inches from the outer edge of its associated tire at the front and about two inches at the outer edge of the rear of that tire, whereby the tire, if it has come off of the axle during movement of the vehicle, will be directed back towards the axle.

6. A system according to claim 1 wherein the cage is made of spring steel.

7. A system according to claim 3 wherein the side bar has a central portion which is positioned inwardly towards the axle.

8. A system according to claim 3 wherein the side bar provides a clearance of approximately one and a half inches from the outer edge of its associated tire at the front and about two inches at the outer edge of the rear of that tire, whereby the tire, if it has come off of the axle during movement of the vehicle, will be directed back towards the axle.

9. A system according to claim 8 wherein the side bar has a central portion which is positioned inwardly towards the axle.

10. A system according to claim 3 wherein the side bar has a clearance with respect to the outside of the wheel which is less than the distance the wheel must move laterally and outwardly to come off an axial mounted hub to which it is normally secured.

* * * * *